United States Patent
Böker

(10) Patent No.: US 10,836,148 B2
(45) Date of Patent: Nov. 17, 2020

(54) METHOD FOR PRODUCING PLATE PACKS

(71) Applicant: Kienle + Spiess GmbH, Sachsenheim (DE)

(72) Inventor: Björn Böker, Esslingen (DE)

(73) Assignee: Kienle + Spiess GmbH, Sachsenheim (DE)

( * ) Notice: Subject to any disclaimer, the term of this patent is extended or adjusted under 35 U.S.C. 154(b) by 0 days.

(21) Appl. No.: 15/781,137

(22) PCT Filed: Dec. 1, 2016

(86) PCT No.: PCT/EP2016/002018
§ 371 (c)(1),
(2) Date: Sep. 18, 2018

(87) PCT Pub. No.: WO2017/097404
PCT Pub. Date: Jun. 15, 2017

(65) Prior Publication Data
US 2019/0240965 A1    Aug. 8, 2019

(30) Foreign Application Priority Data
Dec. 9, 2015 (DE) .......................... 10 2015 016 338

(51) Int. Cl.
*B29C 65/00* (2006.01)
*B32B 37/12* (2006.01)
(Continued)

(52) U.S. Cl.
CPC ............ *B32B 37/1284* (2013.01); *B32B 7/12* (2013.01); *B32B 15/00* (2013.01); *B32B 37/18* (2013.01);
(Continued)

(58) Field of Classification Search
CPC ....... B29C 65/48; B29C 65/482; B29C 65/52; B29C 65/72; B29C 65/74; B29C 65/76;
(Continued)

(56) References Cited

U.S. PATENT DOCUMENTS 6,737,784 B2 * 5/2004 Lindquist ................. H02K 1/02
310/216.004
2007/0209175 A1 * 9/2007 Blocher .................. B21D 28/22
29/25.35
(Continued)

FOREIGN PATENT DOCUMENTS

CN    102216405    10/2011
CN    102369252    3/2012
(Continued)

OTHER PUBLICATIONS

Anonymous: "Propylenglycol"—Sicherheitsdatenblatt (material safety data sheet), pp. 1-4—cited in international search report; updated version Apr. 2018 (English translation attached)—retrieved from http://www.caelo.de/getfile.html?type=sdb&num=2554.

*Primary Examiner* — Mark A Osele
*Assistant Examiner* — Nickolas R Harm
(74) *Attorney, Agent, or Firm* — Gudrun E. Huckett

(57) ABSTRACT

Plate packs are produced from a sheet-like starting product (1), which is cut to form plates, which are stacked to form a plate pack. The plates within the plate stack are joined to one another by a bonding agent. The bonding agent used is a cyanoacrylate adhesive with a high temperature stability rating. It is applied to a wetting layer (14) for the adhesive. The wetting layer (14) is formulated to a pH in a region >7. The cyanoacrylate adhesive with a high temperature stability rating is able to spread on the wetting layer (14) such that effective wetting takes place, thus achieving quick and secure joining of the plates to one another.

17 Claims, 4 Drawing Sheets

(51) Int. Cl.
*B32B 15/00* (2006.01)
*C09J 5/02* (2006.01)
*H02K 15/02* (2006.01)
*B32B 7/12* (2006.01)
*B32B 37/18* (2006.01)
*B32B 38/00* (2006.01)
*F16B 11/00* (2006.01)
*B29C 65/48* (2006.01)
*B29C 65/76* (2006.01)
*B29C 65/72* (2006.01)
*B29C 65/52* (2006.01)
*B29C 65/74* (2006.01)

(52) U.S. Cl.
CPC ............. *B32B 38/0004* (2013.01); *C09J 5/02* (2013.01); *H02K 15/02* (2013.01); *B29C 65/48* (2013.01); *B29C 65/482* (2013.01); *B29C 65/52* (2013.01); *B29C 65/72* (2013.01); *B29C 65/74* (2013.01); *B29C 65/76* (2013.01); *B29C 66/004* (2013.01); *B29C 66/00461* (2013.01); *B29C 66/026* (2013.01); *B29C 66/028* (2013.01); *B29C 66/41* (2013.01); *B29C 66/45* (2013.01); *B29C 66/71* (2013.01); *B32B 2037/1261* (2013.01); *B32B 2307/206* (2013.01); *B32B 2457/00* (2013.01); *C09J 2400/163* (2013.01); *C09J 2400/166* (2013.01); *C09J 2433/00* (2013.01); *F16B 11/006* (2013.01)

(58) Field of Classification Search
CPC ............. B29C 66/004; B29C 66/00461; B29C 66/026; B29C 66/028; B29C 66/41; B29C 66/45; B29C 66/47; B29C 66/71
USPC ......... 156/90, 250, 256, 261, 263, 264, 297, 156/288, 289, 307.3, 326, 390, 510, 512, 156/528, 537
See application file for complete search history.

(56) References Cited

U.S. PATENT DOCUMENTS

| | | | |
|---|---|---|---|
| 2013/0076193 A1* | 3/2013 | Kim | H02K 1/02 310/216.017 |
| 2014/0102486 A1 | 4/2014 | Doyel et al. | |
| 2015/0207366 A1 | 7/2015 | Burkhardt | |
| 2016/0141942 A1 | 5/2016 | Böker | |

FOREIGN PATENT DOCUMENTS

| | | |
|---|---|---|
| EP | 1 731 578 | 12/2006 |
| EP | 2 897 254 | 7/2015 |
| EP | 3 021 466 | 5/2016 |
| JP | S5594979 | 7/1980 |
| JP | S6018560 | 1/1985 |
| JP | S6218485 | 1/1987 |
| JP | S6218486 | 1/1987 |
| JP | 2009-084390 | 4/2009 |

* cited by examiner

Fig. 1
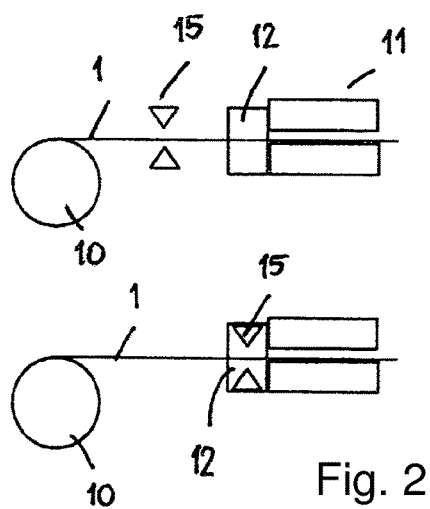
Fig. 2
Fig. 3
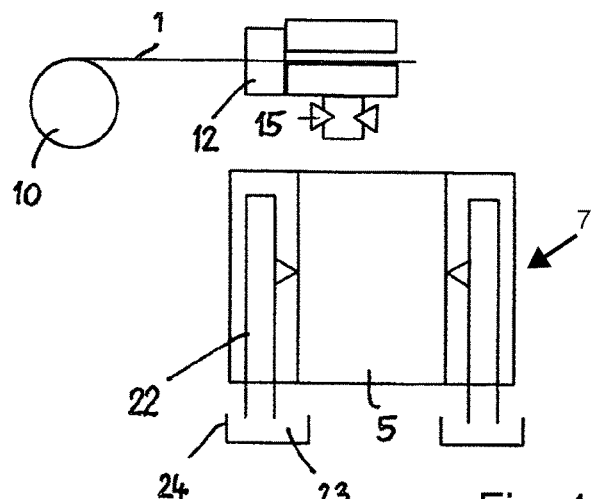
Fig. 4
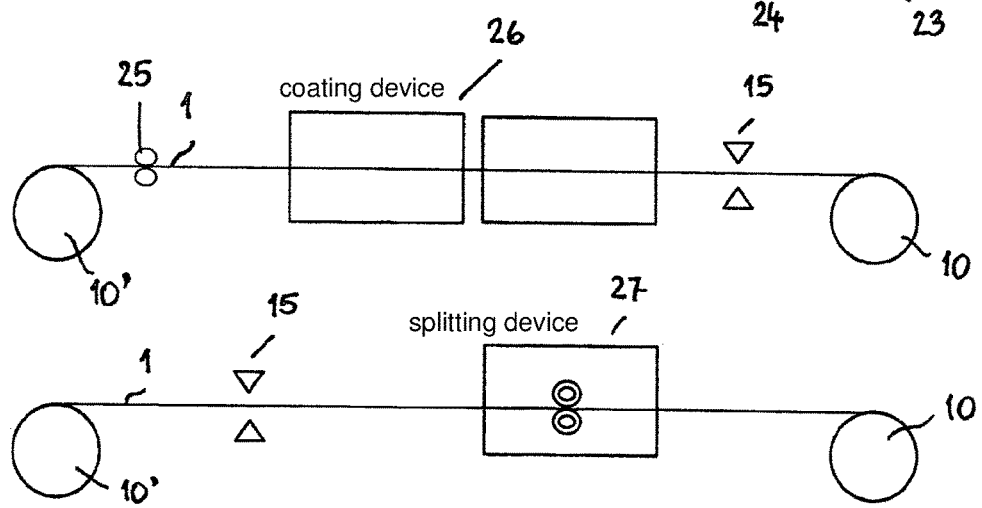
Fig. 11
Fig. 12

Fig. 7a
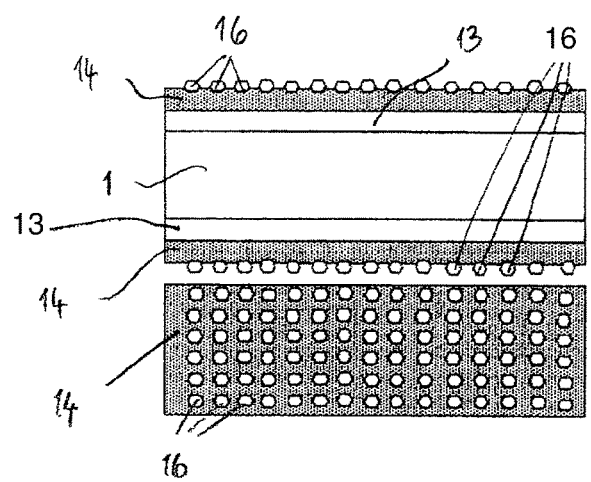
Fig. 7b
Fig. 8a
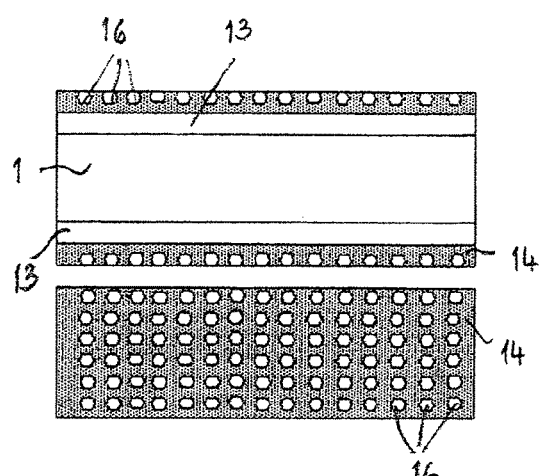
Fig. 8b
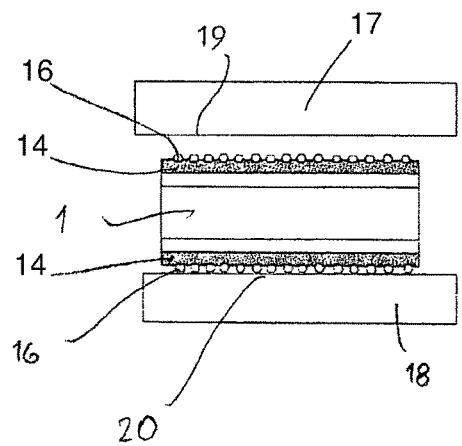
Fig. 9
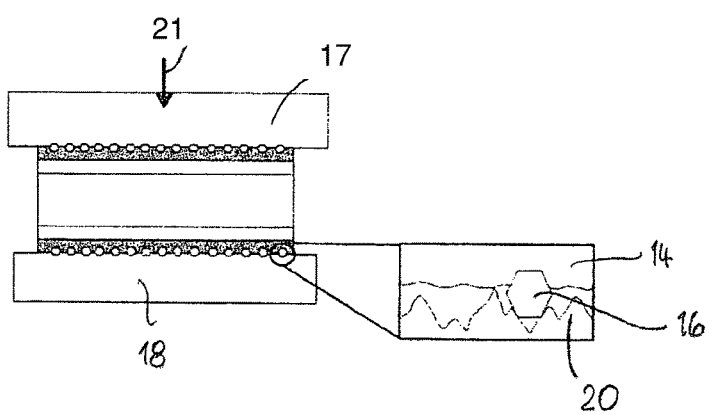
Fig. 10

METHOD FOR PRODUCING PLATE PACKS

BACKGROUND OF THE INVENTION

The invention concerns a method for producing lamination packs in which laminations are cut from a flat starting product and stacked to the lamination pack, wherein the laminations in the lamination stack are connected to each other by a bonding agent.

In electrical machines, sheet metal packs made of stacked laminations are often used which are produced from cut electric sheets or electric strips. For cutting the laminations, usually a punch press with tool or a laser cutting machine is employed. The electric sheets/strips as starting products are in general coated with a thin electrical insulation layer whose thickness is within the μm range. These insulation layers are comprised of organic or inorganic material. Hybrid coatings are also employed which are comprised of organic and inorganic proportions. For the electrical insulation layers, varnishes are employed which are adjusted such that they have a positive effect on the cutting processes and pack assembly method, respectively.

The lamination packs are used for stators and rotors of electrical machines such as electric motors or generators. In order for the laminations lying on top of each other to be connected fixedly to each other within the lamination pack, it is known to connect the laminations lying on top of each other by means of an adhesive. Sometimes, a reliable bonding of laminations lying on top of each other cannot be ensured due to the electrical insulation layers. Sometimes, the reaction time of the adhesive is prolonged. This, for example, has an effect in a punching device in regard to the stroke rate because it depends on the curing time of the adhesive.

The invention has the object to configure the method of the aforementioned kind in such a way that a reliable adhesive connection between the laminations within the lamination pack is ensured wherein the reaction time of the adhesive remains as unaffected as possible by the starting product used for the laminations.

SUMMARY OF THE INVENTION

This object is solved for the method of the aforementioned kind in accordance with the invention in that the bonding agent is a high temperature-resistant cyanoacrylate adhesive which is applied onto a wetting layer for the adhesive that is adjusted such that its pH value is in a range >7.

In the method according to the invention, the wetting layer is applied onto the flat starting product that can be an electric strip or an electric sheet. It ensures that the high temperature-resistant cyanoacrylate adhesive can spread on the wetting layer in such a way that good wetting is achieved. It ensures a reliable and fast connection of the laminations with each other. The wetting layer is adjusted such that its pH value is greater than 7, i.e., is within the alkaline range and the HO⁻ proportion in the wetting layer is sufficiently high. In this way, it is achieved that the curing time or reaction time of the adhesive can be kept short. When a punching device is used, for example, for cutting the laminations, very high stroke rates can then be achieved as a result of the minimal reaction times of the adhesive so that the punching device can operate with a high output. High temperature-resistant cyanoacrylate adhesives are in particular ethyl and allyl cyanoacrylates.

Advantageously, the wetting layer is comprised of dipropylene glycol, distilled and/or demineralized and/or deionized water and, as needed, at least one additive, for example, polyglycol oil. Such a composition of the wetting layer has the additional advantage that it can serve as a lubricant during the cutting process. It has a wear-reducing effect on the punching tool so that the punching tool has a long service life.

Moreover, such a wetting layer has the additional advantage that it protects the starting product against corrosion.

In an advantageous embodiment, synthetic polycrystalline diamond and/or polyglycol oil and/or corrosion protection additives and/or alkaline additives are employed as additives, for example.

The wetting layer contains between approximately 30 and 75% by weight distilled and/or demineralized and/or deionized water and approximately 25 to 70% by weight dipropylene glycol and/or approximately 0 to 20% by weight additives. By means of the proportion of water, the pH value of the wetting layer can be adjusted very easily to the respective application situation so that it can always be ensured that the adhesive will react reliably and properly within very short periods of time.

In a further advantageous embodiment, alkaline additives can assist in pH value determination or adjustment and pH value stabilization. Aqueous solutions are alkaline when the concentration of the hydroxide ions OH⁻ surpasses that of the oxonium ions $H_3O^+$. The pH value is then greater than 7.

Advantageously, only distilled or only demineralized or only deionized water is employed for the wetting layer. When all types of water are employed for the wetting layer, then their total proportion is within the specified range of approximately 30 to approximately 75% by weight.

The proportion of the additive or additives in the wetting layer can be between 0 and approximately 20% by weight. When only one additive is employed, then the proportion of water and/or the proportion of dipropylene glycol or of the other additives can be reduced appropriately in accordance with the proportion of the additive.

In an advantageous embodiment, the wetting layer is applied by a spraying method onto the starting product. In this way, it is ensured that the wetting layer is applied uniformly onto the starting product. In this context, the starting product itself is not stressed.

The wetting layer can be applied also by brushing onto the starting product. By means of brushing, the surface of the starting product can be cleaned to a certain degree so that a reliable reaction between the wetting layer and the adhesive is ensured.

The wetting layer can finally also be applied by polishing onto the starting product.

By means of a solid additive, for example, diamond, in the liquid, the surface can be smoothed by means of polishing or brushing. In an advantageous method, only the surface peaks of the insulation layer are removed in the micro range. The insulation effect of the insulation layer is maintained.

It is advantageous when the wetting layer is applied onto the entire surface of starting product. Then the entire starting product is covered by the wetting layer so that an optimal corrosion protection, an excellent lubrication during the punching process as well as an optimal wetting by the adhesive are ensured.

When the wetting layer is applied onto both faces of the flat starting product, the corrosion protection of the starting product is optimal. Also, it is possible in this way to apply the adhesive selectively onto one of the two faces of the starting product.

In an advantageous embodiment, the wetting layer is applied onto the starting product in the advancing direction of the starting product upstream of a punching device or a corresponding cutting device. The subsequent application of the adhesive can then be realized in a simple way and without impairment by application of the wetting layer. In particular, the corresponding application units for the wetting layer and for the adhesive can be configured in a constructively simple way because they are arranged spatially separated from each other.

There is also the possibility to apply the wetting layer onto the starting product by means of at least one application unit which is located in a punching tool. In this case, the facility used for performing the method can be constructed to be relatively compact. In this context, it is also provided that first the wetting layer is applied before subsequently the adhesive is applied onto the wetting layer.

The application unit provided for the adhesive can be provided advantageously at the punching tool. This is advantageous in regard to the short reaction times of the adhesive because only a minimal period of time is required between the application of the adhesive and cutting the lamination and arranging it on the lamination pack. In this way, it is ensured that the adhesive reacts only once the lamination with the applied adhesive is pushed onto the lamination pack.

With respect to high numbers of cycles when producing the laminations, it is further advantageous when the adhesive and the wetting layer are applied onto the lamination immediately prior to or after cutting from the starting product.

In case of a strip-shaped starting product, an advantageous process resides in that the wetting layer, in advancing direction of the starting product, is applied onto the starting product after coating and prior to winding onto a coiler. This has the advantage that only the adhesive must be applied during the cutting or punching process.

In another advantageous process, the wetting layer, when a strip-shaped starting product is employed, is applied in advancing direction of the starting product prior to splitting the strip.

The subject matter of the application results not only from the subject matter of the individual claims but also from all specifications and features disclosed in the drawings and the description. Even if they are not subject matter of the claims, they are claimed as being important to the invention insofar as, individually or in combination, they are novel relative to the prior art.

Further features of the invention result from the additional claims, the description, and the drawings.

BRIEF DESCRIPTION OF THE DRAWINGS

The invention will be explained in more detail with the aid of some embodiments illustrated in the drawings. It is shown in:

FIGS. 1 to 3 in schematic illustration, respectively, different facilities for performing the method according to the invention;

FIG. 4 in schematic and enlarged illustration a section of a lamination pack which is lying in a braking unit of a punching device;

FIG. 7a, 7b and

FIG. 8a, 8b in an illustration corresponding to FIGS. 6a and 6b further embodiments of an electric sheet or electric strip;

FIG. 9 in schematic illustration the electric sheet or electric strip according to FIGS. 7a, 7b and 8a, 8b in a punching tool whose tool top part is in a starting position;

FIG. 10 in an illustration corresponding to FIG. 9 the tool top part in its end position wherein a part of the contact area between the wetting layer and a tool bottom part is illustrated greatly enlarged;

FIG. 11 in schematic illustration a device for applying a coating and a wetting layer onto an electric strip;

FIG. 12 in an illustration corresponding to FIG. 11 a second embodiment for applying a wetting layer onto an electric strip.

DESCRIPTION OF PREFERRED EMBODIMENTS

Figure 5:
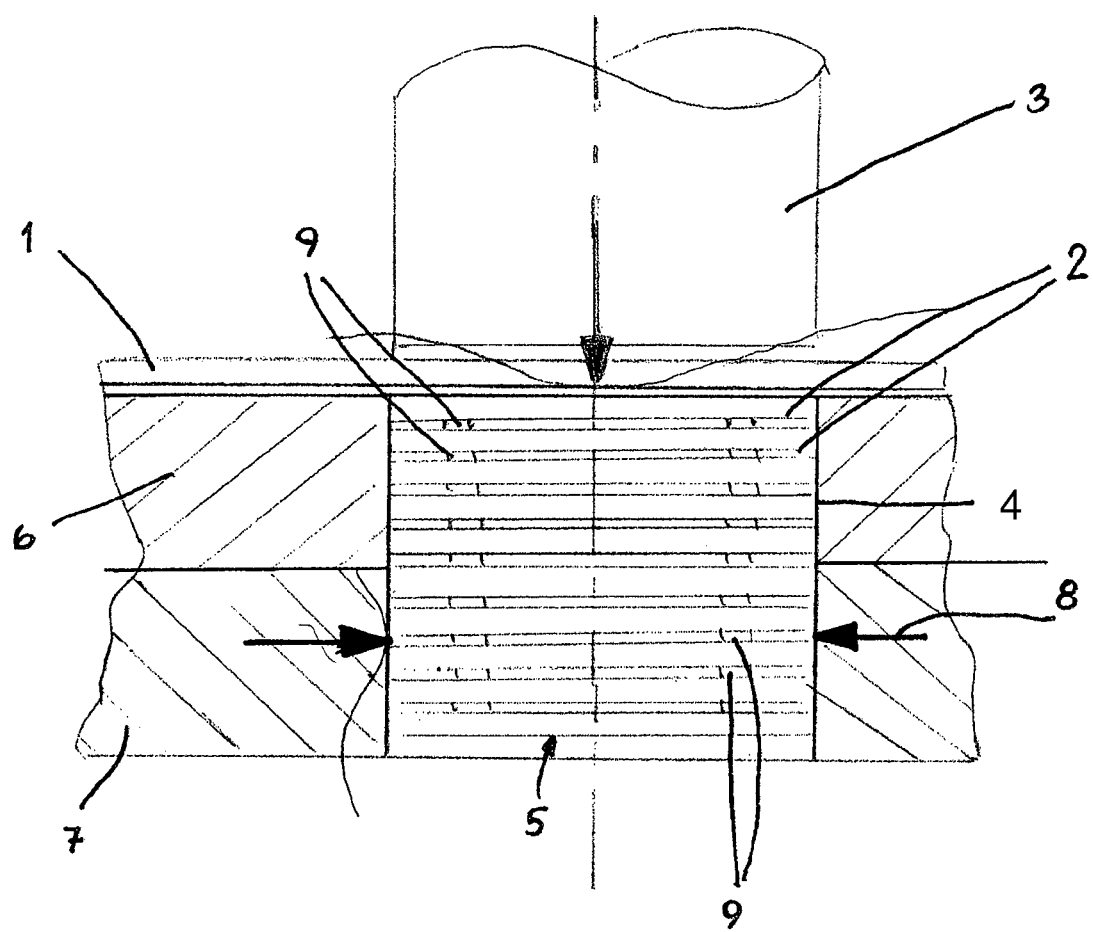
FIG. 5 a section of a punching device in the region of the braking unit.

FIG. 1 shows in schematic illustration a device with which laminations 2 are cut from an electric strip 1 or an electric sheet in a known manner (FIG. 5). In an exemplary fashion, FIG. 5 shows a punch 3 of a punching device 11 with which the laminations 2 are punched from the electric strip 1. They are stacked to a lamination pack 5 in a chamber 4 of the punching device 11. The chamber 4 extends through a bottom die 6 of the punching device 11. As is known, a braking unit 7 is located in the chamber 4 which is of an annular configuration and exerts on the laminations 2 or the lamination pack 5 a radial braking force 8 in the known manner. This braking force is so high that the punch 3 can push the respectively punched lamination 2 with sufficient pressure onto the lamination pack 5 located in the chamber 4 so that the laminations 2 lying on top of each other can be fixedly connected to each other in a way to still be described. In FIG. 5, it is shown in an exemplary fashion that, between neighboring laminations 2 within the lamination pack 5, adhesive dots 9 are located by means of which the laminations 2 lying on top of each other are fixedly connected to each other.

In addition to the adhesive connection, the laminations 2 lying on top of each other can also be connected with form fit to each other, for example, by means of raised portions pushed out of the lamination or partially punched-out tongues which engage corresponding recesses or cutouts of the neighboring lamination, respectively.

The lamination pack 5 is employed for producing rotors and/or stators of electric motors as well as of generators also.

As can be seen in FIG. 1, the electric strip 1 is coiled on a coiler 10 that is rotatable about its axis. The electric strip 1 which is decoiled from the coiler 10 is guided through a straightening apparatus (not illustrated) by means of which the electric strip 1 is straightened for the subsequent punching process. Downstream of the straightening apparatus, the electric strip reaches the punching device 11 in which the laminations 2 are punched in the described way from the electric strip 1.

Also, two or more electric strips 1 can be guided adjacent to each other into the punching device 11 so that the laminations 2 can be punched simultaneously from the individual electric strips 1. Furthermore, it is possible to punch the laminations 2 in the electric strip 1 not only in one track but, for example, also in two tracks.

The punching device 11 is provided with one or a plurality of corresponding punching tools in the form of the punches 3. The laminations 2 which are punched by them reach in the described way the chamber 4 into which the laminations 2 are pushed by the punch 3 immediately after punching. The chamber 4 forms the receptacle for the lamination pack 5. The braking unit 7 ensures that the laminations 2 are contacting with their edge with friction the inner wall of the chamber 4 so that they cannot fall out of the chamber 4. For each punching stroke, the respectively punched lamination 2 is pushed downwardly onto the laminations which are already located within the chamber 4. A support plunger (not illustrated) is projecting into the chamber 4 and the laminations 2 are stacked on it to the lamination pack 5. With each punching stroke, the support plunger is moved step-by-step in downward direction so that the respectively punched lamination 2 can be moved so far downwardly into the chamber 4 that the subsequent lamination 2 to be punched can be reliably pushed into the chamber 4.

In case of a plurality of electric strips 1 guided simultaneously through the punching device 11, it is advantageous when each electric strip 1 has correlated therewith one chamber 4 so that in the punching device 11 a plurality of lamination packs can be stacked adjacent to each other at the same time. However, there is also the possibility to provide in the punching device 11 only one chamber 4 into which the laminations 2 which are punched from different electric strips 1 are transported by means of a transport device, for example, a rotary unit, into the area above the chamber 4 and then are pushed into the chamber 4. Such a transport device is in particular advantageous when the laminations 2 are punched in adjacently positioned tracks from an electric strip 1. Then, the adjacently positioned laminations 2 can be transported with such a transport unit into the only chamber 4.

Within the lamination pack 5, the laminations 2 lying on top of each other are fixedly connected by a bonding agent. In the exemplary embodiment according to FIG. 1, the bonding agent is applied by means of an application unit 12 onto the electric strip 1 in a known manner, still prior to punching the laminations 2. The bonding agent can be applied in different ways onto the electric strip 1, for example, contactless by spraying but also by application by means of a drum, a roller and the like. In this context, the bonding agent can be applied areally but also only in dots or strip-like onto the electric strip 1. Depending on the size of the lamination 2, a different quantity of bonding agent is required in order to connect the laminations 2 fixedly to each other within the lamination pack 5. Preferably, the bonding agent is applied in dots onto the electric strip 1.

As a bonding agent, high temperature-resistant cyanoacrylate adhesives are employed. Ethyl or allyl cyanoacrylates are conceivable as such adhesives. They are solvent-free, cold-curing 1-component adhesives which quickly polymerize and cure within a short period of time. These cyanoacrylate adhesives have a high temperature resistance which reaches at least 130° C., preferably up to approximately 150° C. and higher.

Allyl cyanoacrylate can be exposed to even higher temperatures at minimal loads for short periods of time. After approximately two hours, the adhesive connection reaches a temperature resistance up to 250° C. Ethyl cyanoacrylates can also be used for short periods of time at higher temperatures when the loads are minimal.

Figures 6A, 6B:
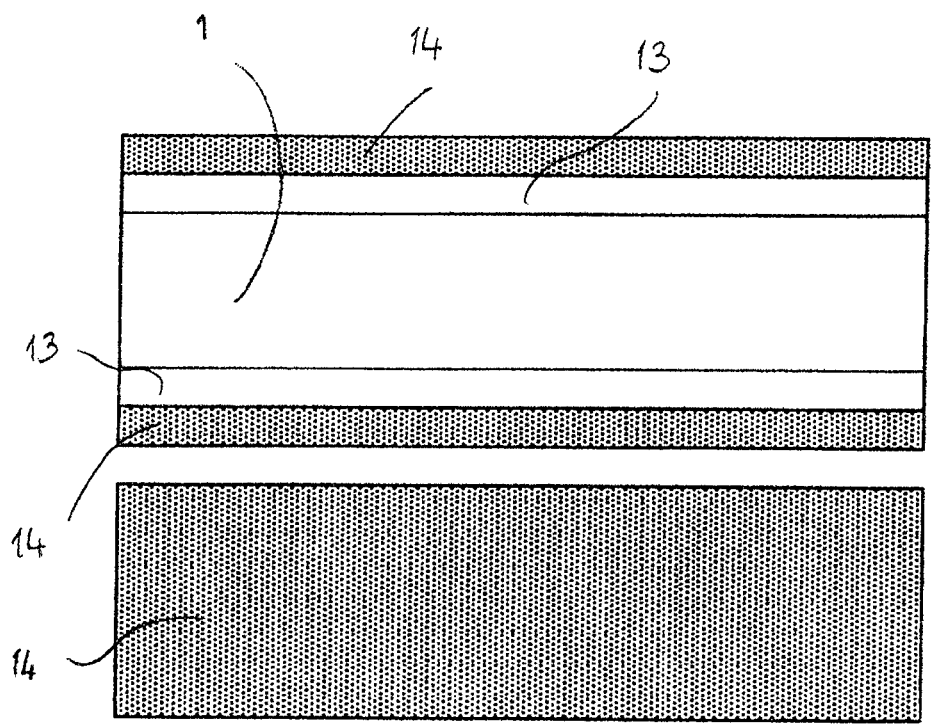
FIG. 6a, 6b in greatly enlarged illustration, in section (FIG. 6a) as well as in plan view (FIG. 6b), an electric strip or an electric sheet which is provided on both faces with a wetting layer.

The electric strip but also electric sheets used for producing the laminations 2 are provided with a coating 13 (FIG. 6a) which forms an electrical insulation layer and is present at both faces of the electric strip 1. The electric insulation layers 13 have only a very minimal thickness which is within the µm range. The insulation layers 13 are comprised preferably of purely organic or purely inorganic materials. However, hybrid coatings can be used also which are comprised of organic and inorganic proportions. Such insulation layers for electric strips 1 or electric sheets are known and are therefore not explained in detail. For forming these insulation layers 13, varnishes are applied onto the electric strip 1, which may exhibit different properties that have a positive effect on the cutting methods as well as the pack assembly or stacking of the laminations 2.

In order for the cyanoacrylate adhesive to ensure a reliable connection of laminations 2 lying on top of each other in the lamination pack 5, a wetting layer 14 is applied onto the insulation layer 13. It is configured such that a good wetting action is achieved with the cyanoacrylate adhesive, the pH value at the surface is >7, and the OH⁻ proportion in the water is predominant. Due to the good wettability of the wetting layer 14, the adhesive drops do not form individual drops but spread areally on the wetting layer 14. In this way, it is ensured that the laminations 2 within the lamination pack 5 are connected reliably and fixedly to each other.

The wetting layer 14 in the embodiment according to FIG. 1 is applied in the region between the coiler 10 and the punching device 11 on both faces of the electric strip 1 by means of an appropriate application unit 15. The application can be realized by spraying, by brushing, or by polishing with the corresponding medium.

For producing the wetting layer 14, a lubricant is employed that contains dipropylene glycol as well as distilled and/or demineralized and/or deionized water. A preferred composition of the lubricant is:

30 to 75% by weight distilled and/or demineralized and/or deionized water 25 to 70% by weight dipropylene glycol.

Depending on the application situation, the lubricant can contain additionally polyglycol oil whose proportion can amount to between 0 and 20% by weight. When polyglycol oil is contained in the lubricant, the proportion of dipropylene glycol and/or of distilled and/or demineralized and/or deionized water can be reduced correspondingly.

As polyglycol oils, in particular polyethylene glycols (PEG), polyalkylene glycols (PAG), and polypropylene glycols (PPG) are conceivable. The pH value of the polyglycol oils is within the alkaline range, i.e., above 7. Since the pH value of the wetting layer 14 is in the alkaline range, not only proper bonding of neighboring laminations 2 can be achieved in connection with the good wettability but also a very short curing time. In this way, high numbers of units can be achieved in the production of the laminations 2 or the lamination packs 5. Due to the use of the wetting layer 14, curing times of approximately one second can be achieved.

The additional lubricant has moreover further advantageous properties. For example, it can be used for increasing the tool service life in the punching process. Moreover, the lubricant serves for cooling the punching process.

In combination, the use of the described lubricant thus results in an effective wear reduction of the punching tools and in an improvement of the energy efficiency in the punching process due to the cooling action.

The described lubricant is water-soluble so that it is easy to handle. The wetting layer 14 also acts to inhibit corrosion. The electric strip 1 or also the electric sheet exhibits no corrosion even after weeks.

The described lubricant has moreover an excellent viscosity index. The viscosity of the lubricant decreases only minimally with increasing temperature so that it ensures constant properties even at higher temperatures.

In the described way, the lubricant contains deionized or also demineralized water. Also, a completely desalted water can be employed. Demineralized water can be obtained in a simple way from normal tap water by means of ion exchangers.

When completely desalted water is employed as an additive to polyglycol oil, the degree of purity is measured by measuring the conductivity. The conductivity measuring devices required for this are known. The lower the conductivity, measured in S/cm or µS/cm, the fewer contaminants are contained in the water.

In order to achieve an optimal corrosion protection as well as excellent lubrication properties, the electric strip 1 is advantageously covered across its entire top and bottom faces by wetting layers 14. Due to the areal application, the punching tool of the punching device 11 is lubricated and cooled by means of the wetting layer 14. During the punching process, the wetting layer 14 is distributed by the corresponding punching tool across the cut surface in the electric strip 1 or in the electric sheet so that the cut surface is protected against corrosion.

FIGS. 7a, 7b and 8a, 8b show in a schematic illustration wetting layers 14 which comprise abrasive and fillers or solid bodies 16, for example, diamond grains. The fillers 16 are provided in distribution in the wetting layer 14. In addition to the described advantages of the wetting layer 14, an optimization, i.e., a reduction of the surface roughness of the laminations 2, is obtained by addition of the fillers 16. This optimization or reduction is the result of the punching process, as will be explained in more detail with the aid of FIGS. 9 to 10. In the embodiment according to FIG. 7a, 7b, the fillers 16 project slightly past the wetting layer 14 (see FIG. 7a) while in the embodiment according to FIG. 8a, 8b they are embedded completely in the wetting layer 14 (see FIG. 8a).

FIG. 9 shows schematically a guide plate of a tool top part as well as a tool bottom part 18 of the punching device 11. Both tool parts 17, 18 each have a flat pressure side 19, 20.

The electric strip 1 or also the electric sheet with the wetting layers 14 applied to both its faces and the fillers 16 contained therein is resting on the pressure side 20 of the tool bottom part 18. The tool top part 17 is spaced from the electric strip 1. It is moved in the direction of arrow 21 (punching direction) downwardly in the direction toward the tool bottom part 18. The fillers 16 in the wetting layer 14 secure during the punching process the electric strip 1. As can be seen in FIG. 10 in greatly enlarged illustration for the tool bottom part 18, this is caused in that the fillers 16 which project partially past the top side of the wetting layer 14 get hooked in the pressure side 20 of the tool bottom part 18 as a result of the roughness of the pressure side 20. In the same way, also the fillers 16 get hooked in the roughness peaks of the pressure side 19 of the tool top part 17.

The described guide plate of the tool top part 17 can be provided in the punching tool itself. In principle, there is also the possibility of providing the guide plate separate from the punching tool in the punching device 11.

In the process according to FIG. 1, by means of the application unit 15 the wetting layer 14 is applied onto both faces of the electric strip prior to adhesive application. The additional lubricant polyglycol oil of the wetting layer 14 ensures that the good lubrication properties are effective in all punching operations. By means of the wetting layers 14 on both faces of the electric strip 1, a reproducible and reliable reaction of the cyanoacrylate adhesive as a result of the alkaline wetting layer 14 is also ensured. The cut surfaces which are produced during the punching process at the electric strip 1 are covered by the wetting agent in the described way so that these cut surfaces are protected against corrosion.

While in the embodiment according to FIG. 1 the application unit 12 for the adhesive is provided at the punching tool, the application unit 15 for the wetting layer 14 is also provided, together with the application unit 12 for the adhesive, at the punching tool in the embodiment according to FIG. 2. By means of the application unit 15, the wetting layer 14 is applied onto both faces of the electric strip 1 that is decoiled from the coiler 10. The application of the material of the wetting layers 14 is realized prior to the adhesive application. In this way, it is ensured that the cyanoacrylate adhesive can react reliably.

FIG. 3 shows schematically a further embodiment in which the application of the wetting medium and of the adhesive is carried out within the braking unit 7 of the punching device 11. In this case, onto the punched laminations 2 first the wetting layer 14 is applied and subsequently the adhesive is applied. The wetting layers 14 provide a high corrosion protection, also of the cut surfaces that are produced at the lamination by punching. On the wetting layers 14, the cyanoacrylate adhesive can react reproducibly and reliably. In FIG. 3, the application units 12 and 15 for the adhesive and the wetting layer material are again only schematically illustrated. The electric strip 1 is decoiled from the coiler 10.

FIG. 4 shows in schematic illustration the lamination pack 5 which is located within the braking unit 7. In the braking unit 7, at least one cooling circuit 22 is accommodated by means of which a cooling medium 23 is conveyed in order to cool the lamination pack 5. The cooling medium is located in a tank 24. Since the lamination pack 5 is formed in the braking unit 7 in the described way, there is sufficient time available in order to cool the laminations 2 or the lamination pack 5 and also to activate the cyanoacrylate adhesive. When the lamination pack 5 is removed from the braking unit 7, the laminations 2 are fixedly and reliably connected to each other.

FIG. 11 shows in schematic illustration a device with which the wetting layer 14 can be applied to the electric strip 1. The electric strip 1 is supplied coiled onto a coiler 10'. The electric strip 1 is guided through a schematically illustrated straightening apparatus 25 with which the electric strip is straightened in the known manner. The electric strip 1 reaches subsequently a coating device 26 in which the coating 13 (FIG. 6) is applied onto the electric strip 1 on both faces. In advancing direction of the electric strip 1 downstream of the coating device 26, at least one application unit 15 is provided with which the wetting layer 14 is applied onto the coating 13 in the described way. The application unit 15 is provided such that it applies the wetting layer 14 to both faces of the electric strip 1. Subsequently, the electric strip 1 with the coating 13 and the wetting layer 14 is wound onto the coiler 10. It is then moved to the punching device 11 with which the laminations 2 are punched and stacked to the lamination pack 5 in the described way.

FIG. 12 shows schematically a device in which the electric strip 1 is decoiled from the drum 10' and guided through a splitting device 27. The electric strip 1, in contrast to the embodiment according to FIG. 11, is already provided with the coating 13. The electric strip 1 in advancing direction upstream of the splitting device 27 is provided by means of an application unit 15 with the wetting layer 14. In the splitting device 27, the electric strip 1 is split across its length in the known manner. The thus produced electric strips are coated on both faces, provided with the wetting layer 14 and are wound onto the coiler 10, respectively. The coiler 10 is then moved to the punching device 11, with which the laminations 2 are punched and the lamination packs 5 are produced in the described way.

What is claimed is:

1. A method for producing lamination packs, the method comprising:
    punching laminations from a flat starting product;
    stacking the laminations to a lamination stack;
    connecting the laminations in the lamination stack to each other by a high temperature-resistant cyanoacrylate adhesive applied to a wetting layer provided on the laminations and adjusted to a pH value in a range >7, wherein the high temperature-resistant cyanoacrylate adhesive has a high temperature resistance of at least 130° C.

2. The method according to claim 1, further comprising preparing the wetting layer from dipropylene glycol, distilled and/or demineralized and/or deionized water, and, optionally, at least one additive.

3. The method according to claim 2, further comprising selecting the at least one additive from the group consisting of diamond; polyglycol oil; corrosion protection additives; and alkaline additives; and combinations thereof.

4. The method according to claim 2, further comprising preparing the wetting layer to contain between approximately 30% to approximately 75% by weight distilled and/or demineralized and/or deionized water and approximately 25% to approximately 70% by weight dipropylene glycol.

5. The method according to claim 2, further comprising selecting a proportion of the at least one additive to be between 0% and approximately 20% by weight of the wetting layer.

6. The method according to claim 1, further comprising spraying the wetting layer onto the starting product.

7. The method according to claim 1, further comprising brushing the wetting layer onto the starting product.

8. The method according to claim 1, further comprising applying the wetting layer by polishing the wetting layer onto the starting product.

9. The method according to claim 1, further comprising applying the wetting layer onto an entire surface of the starting product.

10. The method according to claim 1, further comprising applying the wetting layer onto a first face of the starting product and a second face of the starting product.

11. The method according to claim 1, further comprising applying the wetting layer in an advancing direction of the starting product upstream of a punching device onto the starting product.

12. The method according to claim 1, further comprising applying the wetting layer by at least one application unit, provided at a punching tool, onto the starting product.

13. The method according to claim 1, further comprising providing an application unit for the high temperature-resistant cyanoacrylate adhesive at a punching tool.

14. The method according to claim 1, further comprising applying the high temperature-resistant cyanoacrylate adhesive and the wetting layer onto the starting product immediately prior to punching.

15. The method according to claim 1, further comprising applying the high temperature-resistant cyanoacrylate adhesive and the wetting layer onto the laminations immediately after punching.

16. The method according to claim 1, further comprising providing the starting product as a strip-shaped starting product and applying the wetting layer onto the strip-shaped starting product, in an advancing direction of the strip-shaped starting product, after coating the strip-shaped starting product and prior to winding the strip-shaped starting product onto a coiler.

17. The method according to claim 1, further comprising providing the starting product as a strip-shaped starting product and applying the wetting layer onto the strip-shaped starting product, in an advancing direction of the starting product, prior to splitting the strip-shaped starting product.

* * * * *